SIGNAL STORAGE DEVICE

Original Filed July 19, 1966 3 Sheets-Sheet 1

INVENTORS.
RICHARD C. HANSEN
ANDREW P. YESUL, JR.
BY Anthony D Cennamo
Daniel Rubin
ATTORNEYS

SIGNAL STORAGE DEVICE

Original Filed July 19, 1966 3 Sheets-Sheet 2

INVENTORS.
RICHARD C. HANSEN
ANDREW P. YESUL, JR.
BY Anthony D. Cennamo
Daniel Rubin
ATTORNEYS

SIGNAL STORAGE DEVICE

Original Filed July 19, 1960 3 Sheets-Sheet 3

INVENTORS.
RICHARD C. HANSEN
ANDREW P. YESUL, JR.
BY Anthony D. Cennamo
Daniel Rubin
ATTORNEYS United States Patent Office Re. 27,720
Reissued Aug. 7, 1973

27,720
SIGNAL STORAGE DEVICE

Richard C. Hansen, Rochester, and Andrew P. Yesul, Jr., Penfield, N.Y., by The Xerox Corporation, Stamford, Conn., assignee Original No. 3,416,861, dated Dec. 17, 1968, Ser. No. 566,333, July 19, 1966. Application for reissue Mar. 27, 1972, Ser. No. 238,701
Int. Cl. G03g *15/00*
U.S. Cl. 355—13 8 Claims

Matter enclosed in heavy brackets [ ] appears in the original patent but forms no part of this reissue specification; matter printed in italics indicates the additions made by reissue.

ABSTRACT OF THE DISCLOSURE

This invention relates to a device for the mechanical storage of electrical signals adapted for time delayed switching of utilization apparatus. More specifically, the invention relates to a signal storage device for controlling the operation of a web cutter in a document recording apparatus to effect web cutting in spaced relation to recordings thereon from stored signals generated previously by the original documents of which the recordings were formed.

Many instances exist in which a subsequent event is to occur in timed relation to an event which occurred previously and at random. One common such application is in the graphic recording art in which randomly fed original documents are supplied for reproduction onto a continuous web either in the same consoled unit or via facsimile transmission to a different unit as is known in the art. The web, after appropriate processing to produce a permanent recording thereon, must later be cut by a cutter mechanism to separate each formed reproduction from the remaining portions of the web. It is usual by prior art techniques to graphically or otherwise form a reference indicia on the top or backside of the web generated by the leading and trailing edge passing of an original document past a sensing point. This indicia is later detected along the web path for controlling subsequent cutter action in predefined relation to the reproduction, e.g., to the leading and trailing edges thereof. While such systems have worked satisfactorily they have been largely limited by the marking and detection accuracy of the system and at the same time are unusable for other applications in which it is not feasible to store signals in a marking mode.

Now in accordance with the instant invention there is provided a novel mechanical signal storage device having the capacity of concomitantly storing a plurality of signals to effect electrical switching in timed relation to signals previously generated at random. In the case of a reproduction apparatus, the storage device hereof has the capacity to concomitantly store a plurality of individual signals each generated by the passing of original copy at a scanning station whereby a subsequent web cutting operation will occur in a predetermined space relation to the reproduction thereon.

It is therefore an object of the present invention to provide a novel signal storage device to effect electrical switching in timed relation to signals previously generated.

It is a further object of the invention to provide a novel signal storage device for controlling cutter operation in a recording apparatus whereby to sever a recording web in predetermined spaced relation to reproductions thereon.

It is a still further object of the invention to provide a novel mechanically operable signal storage device for concomitantly storing a plurality of electrical signals to be emitted in timed relation to corresponding input signals thereto.

Further objects and features of the present invention will become apparent from the following detailed description when taken in conjunction with the drawings in which.

While the signal storage device of the invention can be employed in conjunction with a variety of utilization apparatus it will be described in combination with a xerographic recording unit by reference to FIG. 1 in which the various system components are schematically illustrated. The reproduction apparatus disclosed employs the principles of xerography which as in all xerographic systems based on the concept disclosed in Carlson U.S. Patent 2,297,691 projects a light radiation image of copy to be reproduced onto the sensitized surface of a xerographic plate to form an electrostatic latent image. Thereafter, the latent image is developed with oppositely charged material to form a xerographic powder image, corresponding to the latent image, on the plate surface. The powder image is then usually transferred electrostatically to a support surface to which it fused causing the image to permanently adhere to the support surface.

Figure 1:
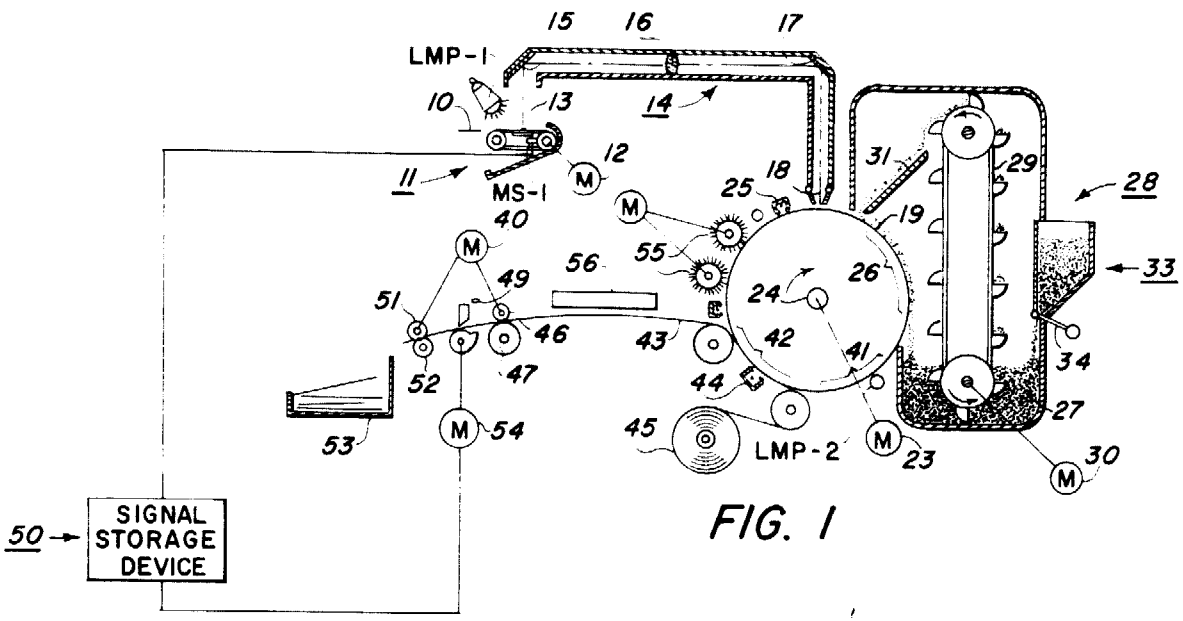
FIG. 1 is a schematic illustration of a reproduction apparatus utilizing the storage device of the invention.
Figure 3:
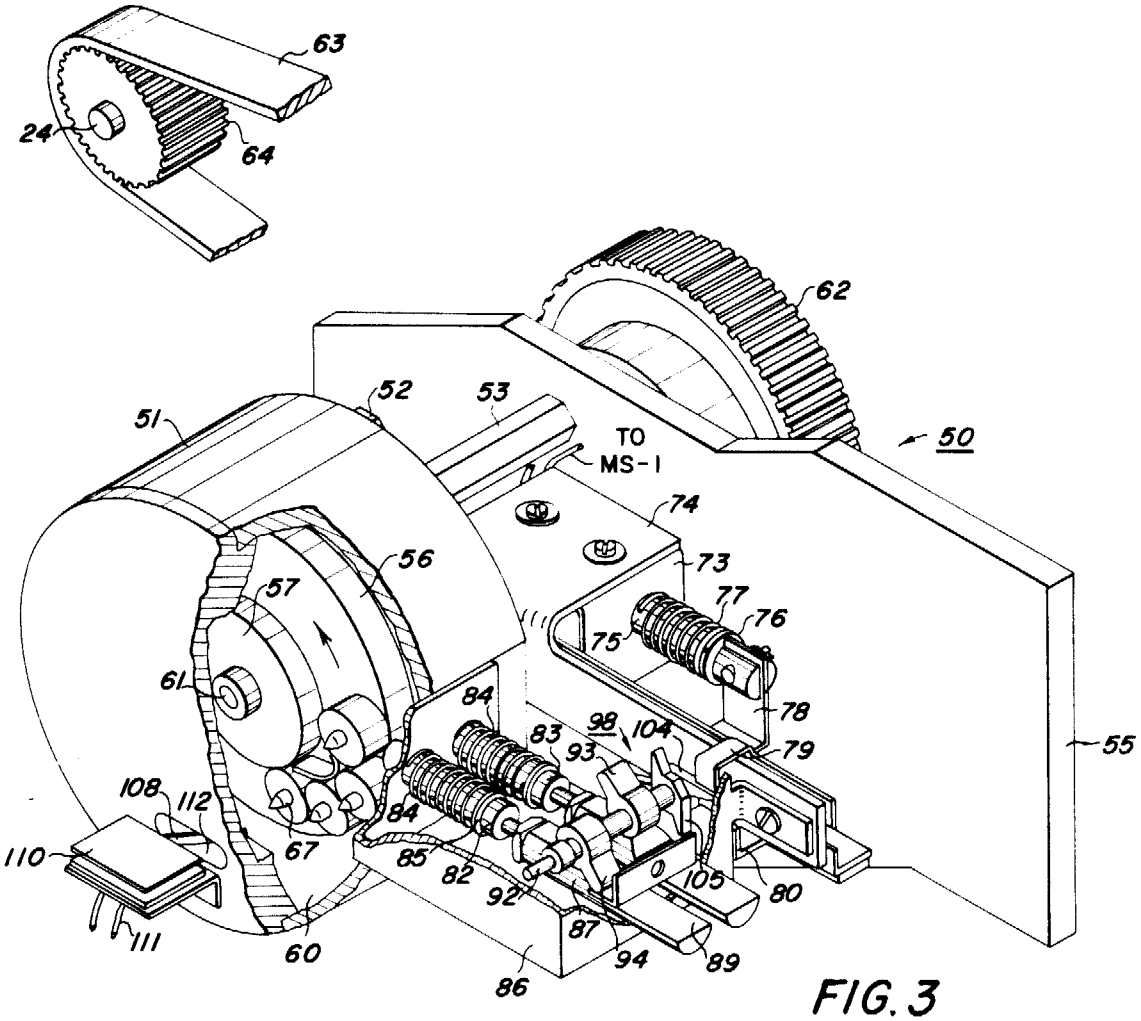
FIG. 3 is an isometric view of the signal storage device hereof.
Figure 5:
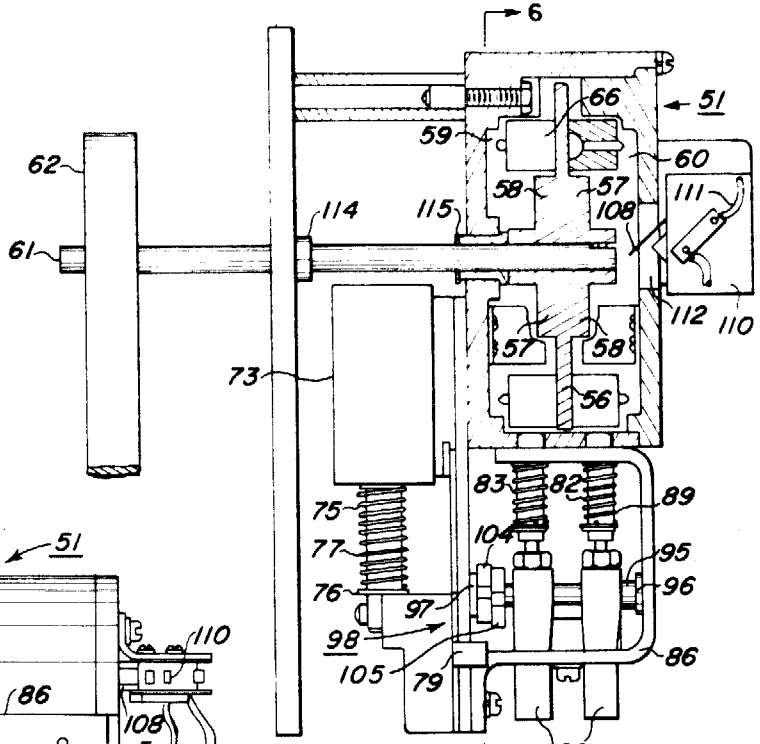
FIG. 5 is a sectional elevation taken substantially along the lines 5—5 of FIG. 4.
Figure 4:
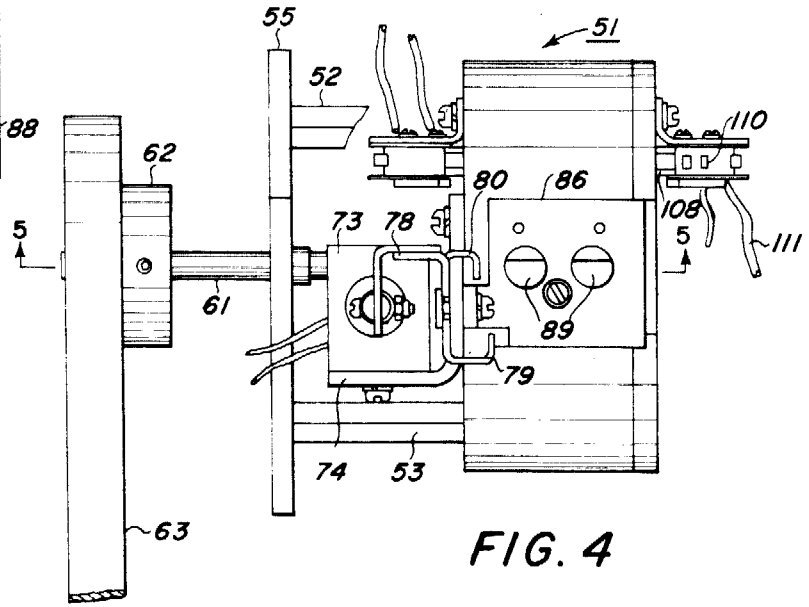
FIG. 4 is a bottom plan view of the signal storage device.

As shown in FIG. 1 the xerographic apparatus described may comprise a type disclosed in U.S. Patent 3,076,399 in which copy to be reproduced is placed on a support tray 10 from which it is fed onto a transport mechanism generally designated 11. Suitable drive means are provided for the transport mechanism from motor 12 to endless belts 13 whereby the original copy is moved past the optical axis of projection lens system 14 and is illuminated by a projection lamp LMP–1. The image of the copy is reflected by mirror 15 to an adjustable objective lens 16 and then reflected by mirror 17 downwardly through a vertical slit aperture assembly 18 onto the surface of a xerographic plate in the form of drum 19.

Xerographic drum 19 includes a cylindrical member mounted on an axle 24 end-supported in suitable bearings in the frame of the machine and is driven by a motor 23 to rotate the drum in a clockwise direction and at a constant rate that is proportional to the transport rate of the copy, whereby the peripheral rate of the drum surface is identical to the rate of movement of the reflected light image. The drum surface comprises a layer of photoconductive material on a conductive backing that is sensitized prior to exposure by means of a corona generating device 25 energized from a suitable high potential source.

The exposure of the drum to the light image discharges the photoconductive layer in the areas struck by light, whereby there remains on the drum a latent electrostatic image in image configuration corresponding to the light image projected from the copy. As the drum surface continues its movement, the electrostatic latent image passes through a developing station 26 at which a two component developer material 27 is cascaded over the drum surface by means of a developing apparatus 28.

In the developing apparatus, developer material is carried by conveyor 29 driven by suitable drive means from motor 30 and is released onto the chute 31 to cascade down over the drum surface. The consumable portion of the developer is contained in dispenser 33 and is released to the developer in amounts controlled by gate 34. After developing, the xerographic powder image passes a discharge station 41 at which the drum surface is illuminated by a lamp LMP–2, whereby residual charges on the non-image areas of the drum surface are completely discharged. Thereafter, the powder image passes through an image transfer station 42 at which the powder image is electrostatically transferred to a support web surface 43 by means of a second corona generating device 44 while the drum is cleaned by means of brushes 55.

The support surface to which the powder image is transferred comprises a continuous web of paper, vellum, cardstock, etc. obtained from a supply roll 45 and from which it is advanced over suitable tensioning rolls being directed into surface contact with the drum in the immediate vicinity of transfer corona generating device 44. After transfer, the support web is separated from the drum surface and guided through a fusing apparatus 56 at which the powder image is permanently affixed thereto. Thereafter, the support surface is continued to be fed by means of a pair of feed rolls 46 and 47 driven by motor 40 until passing a cutter unit 49 appropriately actuated via a drive unit by the signal storage device 50 hereof, as will be described. This effects cutter operation after which the cut sheet is fed via feed rolls 51 and 52 to a hopper bin 53. The cutter 49 may typically be of a type described in U.S. Patent 3,105,425 or 3,075,493.

Figure 2:
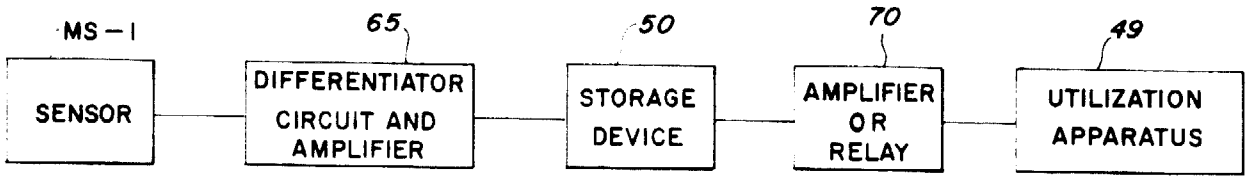
FIG. 2 is a schematic block diagram for operating the device in the manner hereof.

Operation of the signal storage device 50 in order to effect the appropriate control and timing sequence for actuating cutter 49 can be generally understood by reference also to FIG. 2. As there shown a signal is initiated by a microswitch sensor MS–1 having a switching arm extending through transport belt 13 in the path of original copy passing thereover. As each original copy passes over the microswitch the actuating arm thereof is caused to be depressed by the leading copy edge and remains so until the trailing edge has passed permitting the actuating arm to revert to a normally open contact of the switch member, as will be understood. In normal operation, a cut signal is transmitted when the microswitch is both activated and deactivated corresponding to a cut signal at a leading and trailing edge respectively. Differentiator amplifier 65 response to a condition charge in sensor MS–1 to supply a signal to the storage device. The output from the storage device is then conducted through an amplifier 70 to the utilization apparatus here understood to be cutter 49. Other sensor units, such as photoelectric units or the like could likewise be used, the only requirement being that it be electrically responsive to the passing of copy thereover. Likewise a signal from MS–1 can be transmitted in various ways as in a facsimile system disclosed in U.S. Patent 3,196,766.

The signal storage device 50 will now be described with reference to FIGS. 3–6. The device generally is comprised of components all supported in or about a housing 51 that is connected via tie bars 52 and 53 to a mounting plate 55 by which the device can be suitably attached to the utilization apparatus with which it is to be employed.

The housing is non-magnetic and cylindrical in shape having mounted for rotation axially therewithin an annular disc 56 of magnetizable material as will be understood. Formed on opposite disc faces are reduced size axial flanges 57 and 58 the periphery of which with the central portion of the disc relative to the housing interior define annular passageways 59 and 60. The disc is mounted on a rotatable shaft 61 in bearings 114 and 115 and which extends outward from the housing through the mounting plate whereat a timing pulley 62 is secured. The timing pulley is driven by a belt 63 connected also to pulley 64 secured to drum axle 24. Since the speed of web 43 is synchronized to the peripheral speed of drum 19, a constant predetermined timed relation is maintained between shaft 61 and the formation of copy and consequently between an input and output signal from device 50. As will be understood, the total time delay equals the time lapse from an image exposure onto the drum until the image reproduction on the web appears at the cutter proximity. By this means therefore a synchronized timed relation is maintained after microswitch MS–1 is actuated, until corresponding copy-bearing portion of the web 43 arrives into the knife cutting position relative to cutter 49.

Figure 6:
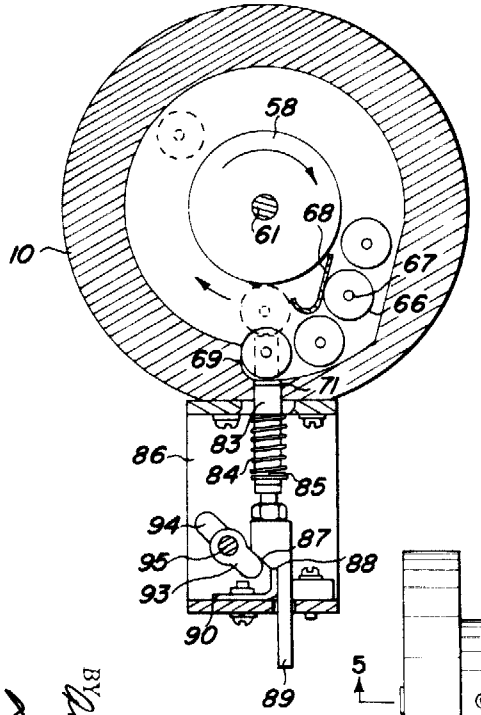
FIG. 6 is a sectional elevation taken substantially along lines 6—6 of FIG. 5.

Within the chamber of passageways 59 and 60, there is contained a plurality of cylindrical magnets 66 from which protrudes an axially secured pin 67. The magnets are arranged axially parallel to shaft 61 and in the absence of a signal to be stored are backed, as shown in FIG. 6 down a ramp 68 against a shoulder recess 69 formed in the housing and which impedes the magnets against further movement. Extending through the housing immediately adjacent the magnet in this latter position in each passageway are ports 71 in which are supported plungers or push rods 82 and 83. As will be understood, these plungers are operable on receipt of an input signal to force a magnet from thereat to beyond the shoulder 69 into magnetically coupled traveling relation with disc 56.

Each input signal is generated via microswitch MS–1 at a solenoid 73 that is mounted within a bifurcated bracket 74 in turn secured to the housing 51. The solenoid armature 75 extends outward from the solenoid and near the end contains a collar 76 behind which is a compressed coil spring 77 to insure a quick return of the armature after the solenoid is deenergized. At the furthest end of the armature there is connected a pallet 78 for movement with the armature in guiding contact against the inside face of the vertical section of bracket 74. Forming an integral part of the pallet are a pair of vertically displaced pawl arms 79 and 80 that bend about and back parallel to the opposite surface of bracket 74.

On receipt of an input signal to the solenoid representing a signal to be stored, the armature is immediately withdrawn accompanied by the withdrawal of pallet 78. This has the effect of causing one magnet to be dislodged from its retained position against recess 69 by means of either plunger 82 or 83. Each of the plunger is supported extending into one of the ports 71 and each contains a spring coil 84 wound thereabout, which is compressed between a collar 85 and the upper flange of channel section 86. Secured to each plunger below its collar is an elongated tail 89 extending through an aperture provided in the channel surface and having formed along its shank a cam follower 87 and a shoulder 88. An angle plate 90 secured on the inside surface of the channel 86 terminates in a bent lip against the shoulder 88 to define the lowermost position of the plunger. This therefore defines the uppermost position of the opposite plunger end to effect a predetermined spacing relative to the surface of the magnet retained thereat.

Engaging the cam followers 87 to effect alternating reciprocation of the plungers are cams 93 and 94 secured to a lateral rotatable shaft 95. The shaft is end supported in bearings 96 and 97 mounted in turn in the vertical faces of channel 86 and bracket 74 respectively. Each of the cams is secured on the shaft 95 displaced 180° from each other and are rotated through 180° with each energizing and deenergizing cycle of the solenoid. This is effected by means of a star wheel 98 secured to the shaft 95 and formed of two adjacent lobes 104 and 105 each having two substantially parallel extending teeth with the teeth of one being substantially 90° displaced from the teeth of the other. Pawl 80 of the pallet 78 is adapted to engage the teeth of lobe 104 on the forward stroke of armature 75 while pawl 79 is adapted to engage the teeth of lobe 105 on the rearward stroke thereof. Accordingly each stroke effected by the armature movement causes lobe 104 and then lobe 105 to rotate shaft 95 through an approximately 90° displacement which in turn causes one of cams 93 or 94 to engage the followers on its associated plunger. This forces the plunger through its port 71 against the magnet being held thereat forcing it out from behind the shoulder into traveling coupled relation with the disc. By the combined forward and return strokes therefore of pawls 79 and 80, shaft 95 incurs 180° displacement whereby the other of the cams will be ready to actuate its associated plunger on the next energizing of the solenoid. After the actuating cam passes, spring 84 immediately restores the depressed plunger to its start position beneath plate 90.

While the magnet is held by the shoulder it is magnetically slip coupled to the rotating disc. As a magnet is dislodged from behind its shoulder stop, it is released for magnetically coupled travel with the disc. Pin 67 protrudes outward of the magnet from its side face and at a predetermined point in travel engages a switch arm 108 extending through housing aperture 112 for energizing either switch 109 or 110 depending on whether the traveling magnet is in passageway 59 or 60 respectively. Either switch when actuated emits an output signal through leads 111 or 112 through amplifier 70 to the appropriate utilization apparatus to be actuated thereby. In the case of the cutter unit described above, the signal energizes the cutter mechanism for an immediate cut signal or within a predetermined time period thereafter. The latter situation would apply where for example it is desired to provide borders or margins before a leading edge and after a trailing edge. Under these circumstances, the signal to cut is required before and after the actual arrival of the leading and trailing edges respectively at the cutter.

In operation, as each input signal to be stored is received at the solenoid 73, the armature thereof operably effects a partial rotation of shaft 95. The cams thereon are then effective for depressing one of the plungers 82 or 83 to discharge a magnet held beneath port 71 permitting it to become coupled for rotation with rotating disc member 56. As a traveling magnet representing a stored signal advances to contact with switch arm 108 the arm is depressed causing energizing of the associated switch and emission of an output signal to be transmitted to the apparatus for immediate or subsequent utilization. By providing alternating action of the plungers 82 and 83, greater inherent storage capacity is provided for concomitant storage of signals by virtue of the increased physical capacity to accommodate an increased number of magnets 66. At the same time by the dual alternating action of the plungers, two closely following signals are permitted to be stored for subsequent signal emission without requiring that the first discharged magnet be in travel before a second magnet can be discharged. Therefore, any feasible number of magnets can be concomitantly rotating with the disc, each in effect storing a previously received input signal, and as they arrive at the appropriate switching position effect an output signal representative thereof. After each magnet actuates the switch it continues in its path of travel until being forced over ramp 68 into the pocket recess 69. While four magnets are shown to be contained in each chamber for a total possibility of eight concomitantly stored signals, this number is shown merely for convenience and it is to be appreciated that more or less could be employed as a function of the particular requirements for which it is to be used.

By the above description there is disclosed a novel signal storage device whereby a plurality of input electrical signals received at random can be concomitantly stored to maintain a delayed output thereof. By means of the invention hereof, this is accomplished by mechanical means simply and inexpensively without complex controls or circuitry while having the flexibility of accommodating any plausible quantity of concomitantly stored signals. The apparatus is accurate in maintaining a fixed time delay between input and output signals and is completely variable with regard to the random order in which the signals can be received and maintained. It should be appreciated that the travel time for the magnets from the time of their discharge until their associated switch is actuated is substantially fixed in a relative sense or a function of drum and web travel. This relationship is always maintained at whatever operational speed is employed including after shutdown and restart. While this relationship can be varied by appropriate gearing or the like in order to vary the rotational speed of shaft 61, some built-in circuit delays, adjustable or not, may be required to effect a precise action of utilization apparatus or adjustment compensation in the particular installation in which it is embodied. As an example of this requirement is the different cutting relation described above required for effecting margins associated with a leading edge as opposed to a trailing edge of a recorded document.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

[1. A signal storage device for emitting a timed delayed output of electrical input signals comprising in combination:

(a) a member mounted for movement;

(b) drive means to continuously move said member at a rate bearing a predetermined time relation between an electrical input signal and a required corresponding output signal thereof;

(c) switch actuator means magnetically attracted to said member and supported in a first position at which movement thereof is arrested and from which it is releasable to a second position magnetically coupled to said member for movement therewith;

(d) means operable in response to the receipt of an input signal to be stored to effect release of said switch actuator means from said first position to said second position; and (e) switch means interposed in the path of said moving switch actuator means to emit an output signal when operably engaged by said switch actuator means during the course of its movement.]

[2. A signal storage device according to claim 1 in which said switch actuator means comprises magnet means.]

[3. A signal storage device according to claim 2 in which said magnet means comprises a plurality of magnets releasable seriatim in an order correlated to the sequential receipt of input signals.]

[4. A signal storage device according to claim 3 in which said member comprises a disc mounted for rotation and said switch actuator means are alternately coupled in said second position to opposite faces of said disc as sequential input signals are received.]

[5. A signal storage device for emitting a timed delayed output of electrical input signals comprising in combination:

(a) a non-magnetic housing;

(b) a magnetically attractable disc mounted for rotation within said housing and defining a substantially annular passage between its surface and the interior surface of said housing;

(c) drive means operably connected to said disc to effect rotation thereof at a rate bearing a predetermined time relation between an input signal and a required corresponding output signal thereof;

(d) magnet means contained within said passage;

(e) means within said passage effective in the absence of an input signal to arrest said magnet means at a first position relative to said disc;

(f) means operable in response to receipt of an input signal to overcome said last recited means and place said magnet means in a second position at which it is free to travel with said member in magnetically coupled relation therewith; and (g) switch means interposed in the path of said moving magnet means to emit an output signal when operably engaged by said magnet means during the course of its movement.]

[6. A signal storage device according to claim 5 in which input signals are received by a solenoid and there is included plunger means reciprocably operable by said solenoid when energized and supported in the absence of a signal extending through said housing to at the first position of said magnet means and on receipt of a signal movable by said solenoid to move said magnet means to said second position.]

[7. A signal storage device according to claim 6 in which said plunger means comprises at least two plungers operably associated with opposite surfaces of said disc and reciprocated in alternate relation as sequential signals are received by said solenoid.]

8. In a xerographic reproduction apparatus including means to form reproductions of original copy during the course of its movement onto a continuously moving web *of indefinite length,* and cutter means *subsequent to said reproduction forming means in the path of movement of said web* for cutting said web *after the reproduction is formed thereon* in *predetermined* spaced relation to the reproduction thereon *to sever the reproduction from said web*:

(*I*) a signal storage device for emitting a timed delayed output signal for the operation of said cutter *means* from an electrical input signal generated by the movement of *such* [the] original copy comprising in combination:

(a) a member mounted for movement;

(b) drive means to continuously move said member at a rate bearing a predetermined time relation between an electrical input signal and a required corresponding output signal thereof;

(c) switch actuator means magnetically attractable to said member and supportable in a first position at which movement thereof is arrested and from which it is releasable to a second position magnetically coupled to said member for movement therewith;

(d) means operable in response to the receipt of an input signal to be stored to effect release of said switch actuator means from said first position to said second position; and (e) switch means interposed in the path of said moving switch actuator means to emit an output signal for effecting operation of said cutter *means* when operably engaged by said switch actuator means during the course of its movement;

(*II*) *means sensing the passage of the leading and trailing edges of such original copy past a reference point and generating said input signal with the passage of each of said edges to release a first actuator representative of said leading edge and a second actuator representative of said trailing edge, said rate of movement of said member being related to the rate of movement of said web to effect operable engagement of said switch means by said first actuator and a first operation of said cutter means when the leading edge of the reproduction on said web is in a predetermined relationship to said cutter means and to effect operable engagement of said switch means by said second actuator and a second operation of said cutter means when the trailing edge of the reproduction on said web is in a predetermined relationship to said cutter means.*

9. *In a xerographic reproduction apparatus* [A signal nal storage device] according to claim 8 [in which] said xerographic apparatus [forms] *forming* reproductions in response to a received facsimile signal.

10. *In a xerographic reproduction apparatus* [A signal storage device] according to claim 8 [in which] said switch actuator means *comprising* [comprises] magnet means.

11. *In a xerographic reproduction apparatus* [A signal storage device] according to claim 9 [in which] said magnet means *comprising* [comprises] a plurality of magnets releasable seriatim in an order correlated to the sequential receipt of input signals.

12. *In a xerographic reproduction apparatus* [A signal storage device] according to claim 11 [in which] said member *comprising* [comprises] a disc mounted for rotation and said switch actuator means *being* [are] alternately coupled in said second position to opposite faces of said disc as sequential input signals are received.

13. In a xerographic reproduction apparatus including means to form reproductions of original copy during the course of its movement onto a continuously moving web *of indefinite length,* and cutter means *subsequent to said reproduction forming means in the path of movement of said web* for cutting said web *after the reproduction is formed thereon* in *predetermined* spaced relation to the reproductions thereon *to sever the reproductions from said web*:

(*I*) a signal storage device for emitting a timed delayed output signal for the operation of said cutters *means* from an electrical input signal generated by the movement of *such* [the] original copy comprising in combination:

(a) a non-magnetic housing;

(b) a magnetically attractable disc mounted for rotation within said housing and defining a substantially annular passage between its surface and the interior surface of said housing;

(c) drive means operably connected to said disc to effect rotation thereof at a rate bearing a predetermined time relation between an input signal and a required corresponding output signal thereof;

(d) magnet means contained within said passage;

(e) means within said passage effective in the absence of an input signal to arrest said magnet means at a first position relative to said disc;

(f) means operable in response to receipt of an input signal to overcome said last recited means and place said magnet means in a second position at which it is free to travel with said member in magnetically coupled relation therewith;

(g) switch means interposed in the path of said moving magnet means to emit an output signal for effectively operation of said cutter *means* when operably engaged by said magnet means during the course of its movement;

(*II*) *means sensing the passage of the leading and trailing edges of such original copy past a reference point and generating said input signal with the passage of each of said edges to release a first magnet means representative of said leading edge and a second magnet means representative of said trailing edge, said rate of movement of said disc being related to the rate of movement of said web to effect operable engagement of said switch means by said first magnet means and a first operation of said cutter means when the leading edge of the reproduction on said web is in a predetermined relationship to said cutter means and to effect operable en-*

*gagement of said switch means by said second magnet means and a second operation of said cutter means when the trailing edge of the reproduction on said web is in a predetermined relationship to said cutter means.*

14. *In a xerographic reproduction apparatus* [A signal storage device] according to claim 13 [in which] input signals *being* [are] received by a solenoid and there *being* [is] included plunger means reciprocably operable by said solenoid when energized and supported in the absence of a signal extending through said housing to the first position of said magnet means and on receipt of a signal movable by said solenoid to move said magnet means to said second position.

15. *In a xerographic reproduction apparatus* [A signal storage device] according to claim 14 [in] said plunger means *comprising* [comprises] at least two plunger operably associated with opposite surfaces of said disc and reciprocated in alternate relation as sequential signals are received by said solenoid.

References Cited

The following references, cited by the Examiner, are of record in the patented file of this patent or the original patent.

UNITED STATES PATENTS

| | | | |
|---|---|---|---|
| 1,528,227 | 3/1925 | Spooner | 214—11 R |
| 2,877,846 | 3/1959 | Tobey | 83—400 |
| 3,051,568 | 8/1962 | Kaprelian | 96—1.4 |
| 3,164,074 | 1/1965 | Francis | 355—13 |

SAMUEL S. MATTHEWS, Primary Examiner

R. M. SHEER, Assistant Examiner

U.S. Cl. X.R.

355—14; 83—203, 399